(12) United States Patent
Mucke et al.

(10) Patent No.: US 9,226,174 B2
(45) Date of Patent: Dec. 29, 2015

(54) IMPROVING RECEPTION BY A WIRELESS COMMUNICATION DEVICE

(71) Applicant: Apple Inc., Cupertino, CA (US)

(72) Inventors: Christian W. Mucke, Sunnyvale, CA (US); Tarik Tabet, Los Gatos, CA (US); Xiangying Yang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 119 days.

(21) Appl. No.: 13/899,250

(22) Filed: May 21, 2013

(65) Prior Publication Data

US 2013/0329586 A1 Dec. 12, 2013

Related U.S. Application Data

(60) Provisional application No. 61/657,784, filed on Jun. 9, 2012.

(51) Int. Cl.
H04W 24/00 (2009.01)
H04W 24/02 (2009.01)
H04W 28/18 (2009.01)
H04B 1/10 (2006.01)
H04J 11/00 (2006.01)
H04L 5/00 (2006.01)
H04B 1/525 (2015.01)
H04B 1/04 (2006.01)

(52) U.S. Cl.
CPC .............. H04W 24/02 (2013.01); H04B 1/1027 (2013.01); H04B 1/525 (2013.01); H04J 11/0036 (2013.01); H04L 5/001 (2013.01); H04W 28/18 (2013.01); H04B 1/0475 (2013.01)

(58) Field of Classification Search
USPC .................................................. 370/252, 328
See application file for complete search history.

(56) References Cited

U.S. PATENT DOCUMENTS

| 8,412,139 | B2 | 4/2013 | Park et al. | |
|---|---|---|---|---|
| 2011/0199908 | A1* | 8/2011 | Dalsgaard et al. | 370/241 |
| 2011/0205905 | A1* | 8/2011 | Kang et al. | 370/241 |
| 2011/0274074 | A1* | 11/2011 | Lee et al. | 370/329 |
| 2012/0099466 | A1* | 4/2012 | Aoyama et al. | 370/252 |
| 2012/0281563 | A1 | 11/2012 | Comsa et al. | |
| 2012/0281582 | A1* | 11/2012 | Yang et al. | 370/252 |
| 2013/0039342 | A1 | 2/2013 | Kazmi | |
| 2013/0044791 | A1* | 2/2013 | Rimini et al. | 375/219 |
| 2013/0241666 | A1* | 9/2013 | Granger-Jones et al. | 333/101 |
| 2013/0242939 | A1* | 9/2013 | Wagner | 370/331 |
| 2013/0244722 | A1* | 9/2013 | Rousu et al. | 455/552.1 |
| 2013/0322260 | A1* | 12/2013 | Yao et al. | 370/241 |

(Continued)

FOREIGN PATENT DOCUMENTS

WO WO2011140046 11/2011

Primary Examiner — Andrew Lee
(74) Attorney, Agent, or Firm — Downey Brand LLP

(57) ABSTRACT

A method for improving reception by a wireless communication device is provided. The method can include a wireless communication device using a first RF chain to support a connection to a network via a first frequency band. The method can further include the wireless communication device tuning a second RF chain, which is not being actively used for carrier aggregation, to a second frequency band. The method can additionally include the wireless communication device measuring, via the second RF chain, a signal characteristic of the second frequency band. The method can also include the wireless communication device adjusting a configuration of the first RF chain based at least in part on the measured signal characteristic.

17 Claims, 9 Drawing Sheets

(56) References Cited

U.S. PATENT DOCUMENTS

2014/0038532 A1* 2/2014 George et al. .................. 455/78
2014/0055210 A1* 2/2014 Black et al. .................... 333/132
2014/0256309 A1* 9/2014 Deng et al. .................. 455/422.1

* cited by examiner

IMPROVING RECEPTION BY A WIRELESS COMMUNICATION DEVICE

CROSS-REFERENCE TO RELATED APPLICATIONS

This application claims priority to U.S. Provisional Patent Application No. 61/657,784, filed on Jun. 9, 2012, which incorporated herein by reference in its entirety.

FIELD OF THE DESCRIBED EMBODIMENTS

The described embodiments relate generally to wireless communications and more particularly to improving reception by a wireless communication device.

BACKGROUND

Modern wireless communication devices continue to evolve to offer an ever increasing array of capabilities, and are now virtually ubiquitously used by consumers to access a variety of data intensive services via wireless networks. The resulting increased demand on networks to support data intensive services for a rapidly increasing number of devices has placed a demand on network operators to offer upgraded networks capable of supporting both increased data capacity and faster data rates. As such, efforts continue to be made to develop advanced radio access technologies (RATs) to provide higher throughput for data transmitted via wireless networks to support the demand for data services from modern wireless communication devices. For example, some modern cellular RATs, such as Long Term Evolution (LTE) Release 10 and beyond, also referred to as LTE-Advanced (LTE-A), support a technique known as carrier aggregation, in which bandwidth can be extended through the aggregation of multiple carrier components (CC). In this regard, rather than using a single carrier to support communication between a device and the network, carrier aggregation uses multiple CCs in parallel such that bandwidth for data transmissions to and/or from a wireless communication device can be increased through the aggregation of multiple CCs for conveying data transmissions.

In LTE-A systems, each CC is backward compatible with the LTE Release 8 carrier structure. Carrier aggregation can be supported through the use of both contiguous and non-contiguous spectrums. In this regard, CCs used for carrier aggregation can utilize adjacent frequency bands, or can utilize non-adjacent frequency bands.

SUMMARY OF THE DESCRIBED EMBODIMENTS

Some example embodiments disclosed herein provide for improving reception by a wireless communication device. More particularly, some example embodiments use an available secondary RF chain to improve reception by a primary, or otherwise active, RF chain in a carrier aggregation capable wireless communication device. For example, in some example embodiments, a secondary RF chain dedicated to a secondary cell can be reused when usage of a CC associated with the secondary cell is not active. The unused secondary RF chain can be tuned to a frequency band, B, which may interfere with a frequency band used by the primary RF chain. For example, the frequency band B can be a band adjacent to the frequency band used by the primary RF chain such that energy from band B can leak into the frequency band used by the primary RF chain and cause interference to the primary RF chain. The secondary RF chain can be used to make a measurement of a signal characteristic of the frequency band B, which can be indicative of a level of interference from the frequency band B on reception by the primary RF chain. In accordance with some example embodiments, the measurement of frequency band B by the secondary RF chain can be fed back to the primary RF chain and used to adjust a configuration of the primary RF chain so as to mitigate interference on and improve reception by the primary RF chain.

Some example embodiments can be particularly advantageous for mitigating interference from blocking adjacent interference bands in wireless communication devices operated in areas in which networks using multiple RATs (e.g., multiple cellular RATs) are overlaid and a frequency band for one RAT can be adjacent to a frequency band used by a RAT implemented by the device's serving network. Further, some example embodiments can be used to mitigate in-device interference from concurrent usage of a cellular connection and a communication technology utilizing an adjacent Industrial, Scientific, and Medical (ISM) band, such as Bluetooth or Wi-Fi.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. Other embodiments, aspects, and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings are not necessarily drawn to scale, and in no way limit any changes in form and detail that may be made to the described embodiments by one skilled in the art without departing from the spirit and scope of the described embodiments.

DETAILED DESCRIPTION OF SELECTED EMBODIMENTS

Figure 1:
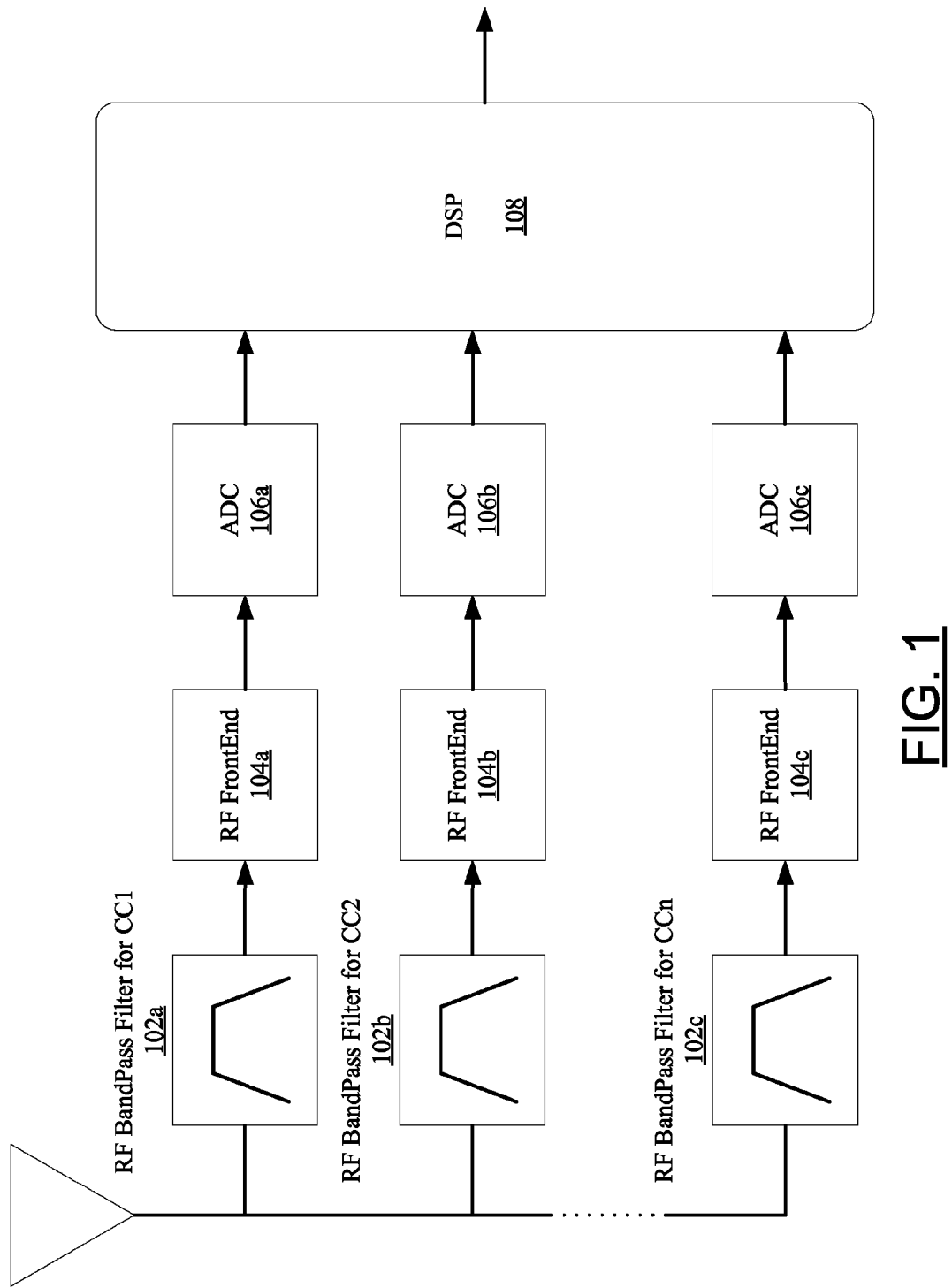
FIG. 1 illustrates an example transceiver architecture in accordance with some example embodiments.

A wireless communication device capable of using carrier aggregation implements multiple radio frequency (RF) chains to support carrier aggregation. In this regard, when carrier aggregation is activated on a device, the wireless communication device can use a separate RF chain for each CC allocated to the device. Carrier aggregation can be activated and deactivated through MAC signaling between the serving network and device. For example, carrier aggregation can be deactivated when additional bandwidth is not needed to support active data services in order to save battery at the wireless communication device, as the concurrent usage of multiple RF chains can increase device power consumption. When carrier aggregation is deactivated, the secondary RF chain(s) on the device can be unused, while a primary RF chain can continue to be used to support a network connection via a single carrier.

One problem impacting reception by wireless communication devices is interference. While interference can result from a number of causes, one particularly damaging source of interference is energy emitted in adjacent or otherwise nearby frequency bands that leaks into a frequency band on which the wireless communication device is receiving data and damages the data reception. For example, blocking adjacent interference bands can result in scenarios in which networks using multiple cellular and/or other RATs are overlaid in a geographic area and a frequency band for one such RAT is adjacent to a frequency band used by a RAT implemented by a device's serving network. As a further example, in-device interference can result in situations in which a device uses co-located radios to concurrently communicate via multiple wireless communication technologies using proximate frequency bands, such as in scenarios in which a device has concurrent connections to a cellular network and a network(s) using an ISM band, such as a Bluetooth and/or Wi-Fi network. In this regard, when multiple co-located radios are operating in adjacent RF spectrum, an in-device interference condition can result in which transmissions of one radio can interfere with reception of another radio.

Many prior attempts at solving interference conditions have centered on overdesigning analog-to-digital converters (ADCs) to include additional bit(s) to request signal back off to avoid reaching saturation from interference. However, such overdesigned ADCs can significantly increase battery consumption and take up valuable chip space in mobile wireless communication devices.

As previously discussed, some modern RATs, such as LTE-A, and modern wireless communication devices configured to operate over such RATs support carrier aggregation techniques in which communication between a device and a network can be conveyed over multiple CCs so as to increase available bandwidth for communication between the device and the network. A device implementing carrier aggregation can include multiple RF chains, with each CC used by the device being supported by a separate RF chain.

In instances in which carrier aggregation is deactivated and in instances in which carrier aggregation is not using a full complement of available RF chains on a device, one or more secondary RF chains can be unused. Some example embodiments leverage an unused RF chain to improve reception by another RF chain. More particularly, in some example embodiments, a secondary RF chain can be tuned to a frequency band, B, which may interfere with a frequency band used by an active RF chain. The secondary RF chain can be used to make a measurement of a signal characteristic of the frequency band B, which can be indicative of a level of interference from the frequency band B on reception by the active RF chain. In accordance with some example embodiments, the measurement of frequency band B by the secondary RF chain can be fed back to the primary RF chain and used to adjust a configuration of the primary RF chain so as to mitigate interference on and improve reception by the primary RF chain. Such example embodiments can accordingly be used to mitigate interference from blocking adjacent interference bands, and can facilitate in-device coexistence between radios.

Moreover, some example embodiments can improve reception and reduce the effects of interference on a receiver without the increased power consumption of techniques using over-designed ADCs. In this regard, some example embodiments can eliminate the need to include additional bits in the ADC to mitigate interference effects, and can thus reduce the amount of power consumed by the ADC compared to prior designs. However, it will be appreciated that some example embodiments can be implemented in combination with an over-designed ADC.

FIG. 1 illustrates an example transceiver architecture that can be implemented on a carrier aggregation capable wireless communication device in accordance with some example embodiments. As illustrated in FIG. 1, a transceiver on a carrier aggregation capable wireless communication device can include a plurality of RF chains, which can be used to support respective CCs. For example, a first RF chain can be used for CC1, a second RF chain can be used for CC2 . . . and an $n^{th}$ RF chain can be used for CCn. In this regard, a transceiver architecture in accordance with some example embodiments can include at least a number of RF chains corresponding to a number of CCs that can be aggregated in accordance with device and/or network specifications. For example, in some LTE-A systems support aggregation of up to 5 CCs, and a transceiver configuration on a device configured to operate on such LTE-A systems can include at least 5 RF chains to support the use of 5 CCs. It will be appreciated, however, that a carrier aggregation capable wireless communication device in accordance with various example embodiments can include any number, n, RF chains, where n is at least two.

In the example architecture illustrated in FIG. 1, each RF chain can include an RF band pass filter 102, an RF front end 104, and an analog-to-digital converter (ADC) 106. In this regard, the first RF chain can include the RF band pass filter 102a, RF front end 104a, and ADC 106a; the second RF chain can include the RF band pass filter 102b, RF front end 104b, and ADC 106b; and the nth RF chain can include the RF band pass filter 102c, RF front end 104c, and ADC 106c. It will be appreciated, however, that the RF chain architecture illustrated in FIG. 1 is illustrated by way of example, and not by way of limitation. In this regard, an RF chain in accordance with various example embodiments can include additional and/or alternative elements to those illustrated in FIG. 1. In the example architecture of FIG. 1, each RF chain can feed into a digital signal processor (DSP) 108.

Figure 2:
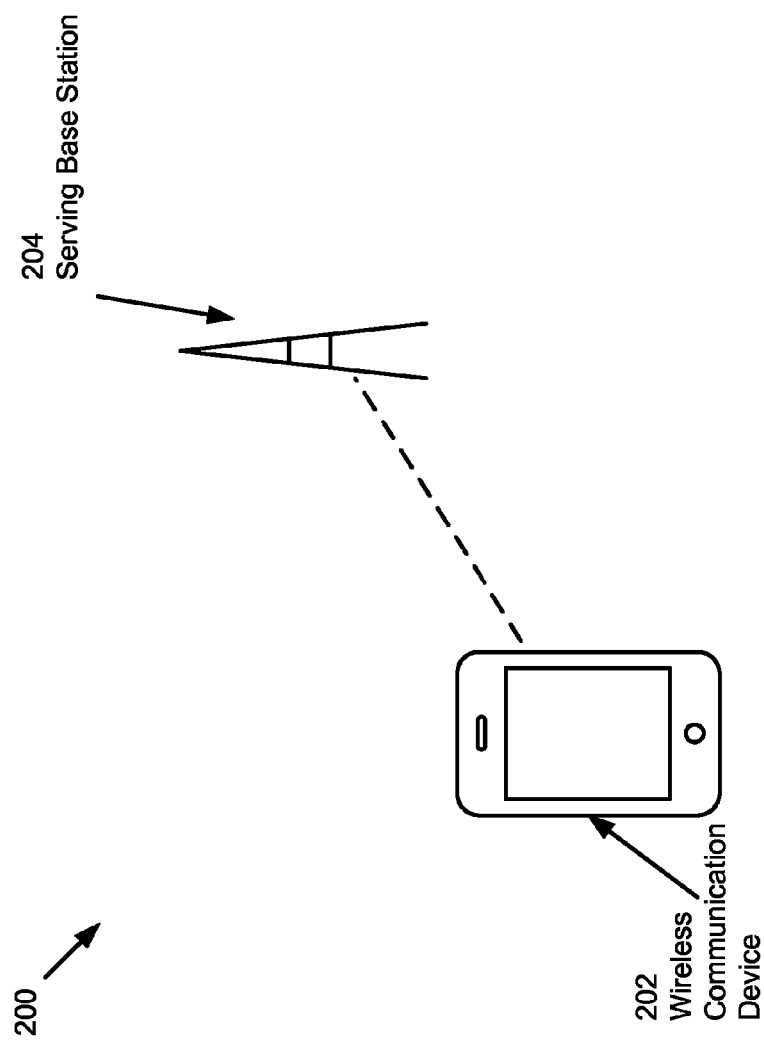
FIG. 2 illustrates a wireless communication system in accordance with some example embodiments.

FIG. 2 illustrates a wireless communication system 200 in which some example embodiments can be applied. In this regard, FIG. 2 illustrates a wireless cellular access network including a wireless communication device 202 and a serving base station 204, which can provide network access to the wireless communication device 202 via one or more radio links. By way of non-limiting example, the wireless communication device 202 can be a cellular phone, such as a smart phone device, a tablet computing device, a laptop computing device, or other computing device configured to access a cellular and/or other wireless network via a serving base station 204. The serving base station 204 can be any cellular base station, such as an evolved node B (eNB), node B, base transceiver station (BTS), and/or any other type of base station.

The wireless access network of the system 200 can be a carrier aggregation capable network implementing any RAT that can support carrier aggregation techniques, including, by way of non-limiting example, an LTE RAT, such as LTE, LTE-Advanced (LTE-A), and/or other carrier aggregation capable LTE RAT. It will be appreciated, however, that the embodiments disclosed herein are not limited to application within LTE systems, and can be applied to any present or future-developed RAT supporting carrier aggregation. Further, it will be appreciated that some example embodiments can be applied to non-cellular wireless RATs in which carrier aggregation techniques can be implemented. Thus, for example, it will be appreciated that a wireless network access point in accordance with any such RAT can be substituted for the serving base station 204 within the scope of the disclosure. Further, it will be appreciated that where various embodiments are discussed by way of example as being applied to LTE and/or other cellular RAT, such examples are provided as non-limiting examples of the applications of some example embodiments and the techniques can be applied to another RAT using carrier aggregation techniques within the scope of the disclosure.

The wireless communication device 202 can include a plurality of RF chains to support carrier aggregation. In this regard, the wireless communication device 202 can, for example, include a transceiver architecture, such as that illustrated in FIG. 1. When carrier aggregation is activated on the wireless communication device 202, the wireless communication device 202 can use multiple RF chains concurrently to support aggregation of multiple CCs. Each CC can correspond to a separate serving cell. In some instances, each CC used by the wireless communication device 202 can be supported by the serving base station 204. In this regard, the serving base station 204 can, in some example embodiments, support multiple co-located cells. However, in some instances, one or more CCs that can be used by the wireless communication device 202 can be supported by one or more further base stations that can be disposed within the wireless access network.

The radio resource control (RRC) connection for the wireless communication device 202 can be handled by a primary serving cell, which can be served by a primary CC. The RF chain on the wireless communication device 202 that can be dedicated to the primary CC can be referred to as a primary RF chain. The further CC(s) used by the wireless communication device 202 when carrier aggregation is activated can be referred to as secondary CCs, and the RF chain(s) on the wireless communication device 202 that can be dedicated to the active secondary CC(s) can be referred to as secondary RF chains.

Figure 3:
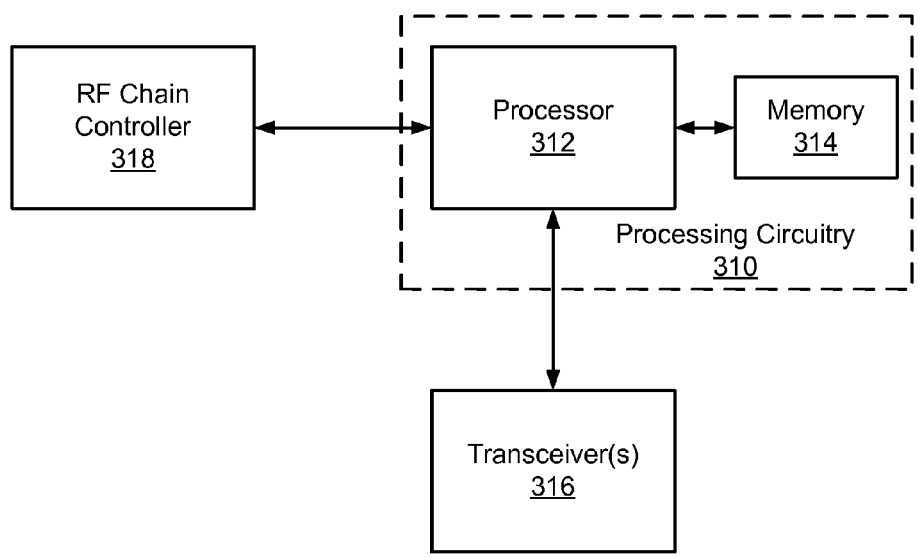
FIG. 3 illustrates a block diagram of an apparatus that can be implemented on a wireless communication device in accordance with some example embodiments.

FIG. 3 illustrates a block diagram of an apparatus 300 that can be implemented on a wireless communication device 202, in accordance with some example embodiments. In this regard, when implemented on a computing device, such as wireless communication device 202, apparatus 300 can enable the computing device to operate within the system 200 in accordance with one or more example embodiments. It will be appreciated that the components, devices or elements illustrated in and described with respect to FIG. 3 below may not be mandatory and thus some may be omitted in certain embodiments. Additionally, some embodiments can include further or different components, devices or elements beyond those illustrated in and described with respect to FIG. 3.

In some example embodiments, the apparatus 300 can include processing circuitry 310 that is configurable to perform actions in accordance with one or more example embodiments disclosed herein. In this regard, the processing circuitry 310 can be configured to perform and/or control performance of one or more functionalities of the apparatus 300 in accordance with various example embodiments, and thus can provide means for performing functionalities of the apparatus 300 in accordance with various example embodiments. The processing circuitry 310 can be configured to perform data processing, application execution and/or other processing and management services according to one or more example embodiments.

In some embodiments, the apparatus 300 or a portion(s) or component(s) thereof, such as the processing circuitry 310, can include one or more chipsets, which can each include one or more chips. The processing circuitry 310 and/or one or more further components of the apparatus 300 can therefore, in some instances, be configured to implement an embodiment on a chipset. In some example embodiments in which one or more components of the apparatus 300 are embodied as a chipset, the chipset can be capable of enabling a computing device to operate in the system 200 when implemented on or otherwise operably coupled to the computing device. In some example embodiments, the apparatus 300 can include a cellular chipset, which can be configured to enable a computing device, such as wireless communication device 202, to operate on one or more cellular networks.

In some example embodiments, the processing circuitry 310 can include a processor 312 and, in some embodiments, such as that illustrated in FIG. 3, can further include memory 314. The processing circuitry 310 can be in communication with or otherwise control the transceiver(s) 316 and/or RF chain controller 318.

The processor 312 can be embodied in a variety of forms. For example, the processor 312 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 312 can comprise a plurality of processors. The plurality of processors can be in operative communication with each other and can be collectively configured to perform one or more functionalities of the apparatus 300 as described herein. In some example embodiments, the processor 312 can be configured to execute instructions that can be stored in the memory 314 or that can be otherwise accessible to the processor 312. As such, whether configured by hardware or by a combination of hardware and software, the processor 312 capable of performing operations according to various embodiments while configured accordingly.

In some example embodiments, the memory 314 can include one or more memory devices. Memory 314 can include fixed and/or removable memory devices. In some embodiments, the memory 314 can provide a non-transitory computer-readable storage medium that can store computer program instructions that can be executed by the processor 312. In this regard, the memory 314 can be configured to store information, data, applications, instructions and/or the like for enabling the apparatus 300 to carry out various functions in accordance with one or more example embodiments. In some embodiments, the memory 314 can be in communication with one or more of the processor 312, transceiver(s) 316, or RF chain controller 318 via a bus(es) for passing information among components of the apparatus 300.

The apparatus 300 can further include one or more transceivers 316. The transceiver(s) 316 can enable the apparatus 300 to send wireless signals to and receive signals from one or more wireless networks. Thus, for example, when implemented on wireless communication device 202, the transceiver(s) 316 can be configured to support a connection to one or more base stations, such as serving base station 204, via one or more CCs. The transceiver(s) 316 can include two or more RF chains to support carrier aggregation. In some example embodiments, the transceiver(s) 316 can be at least partially implemented via an architecture such as that illustrated in FIG. 1. In some example embodiments, the RF chains can be implemented on a single chip. Alternatively, in some example embodiments, the RF chains can be distributed across a plurality of chips that can be in operative communication with each other, and which can collectively provide functionality of the transceiver(s) 316. The transceiver(s) 316 can include any number, n, RF chains, where n is at least two. The number of RF chains included in the transceiver(s) 316 in some example embodiments can correspond to a number of CCs that the apparatus 300 and/or serving network can be configured to support for aggregation. However, it will be appreciated that in some example embodiments, the apparatus 300 can include additional or fewer RF chains than a corresponding number of CCs that can be aggregated in accordance with capabilities of a serving network.

The transceiver(s) 316 can additionally include one or more transceivers and/or other radio components to support one or more further wireless communication technologies that can be implemented on a wireless communication device 202. For example, the transceiver(s) 316 can include radio components for supporting communication via Wi-Fi, Bluetooth, and/or other ISM band communications technology.

The apparatus 300 can further include RF chain controller 318. The RF chain controller 318 can be embodied as various means, such as circuitry, hardware, a computer program product comprising computer readable program instructions stored on a computer readable medium (for example, the memory 314) and executed by a processing device (for example, the processor 312), or some combination thereof. In some embodiments, the processor 312 (or the processing circuitry 310) can include, or otherwise control the RF chain controller 318. The RF chain controller 318 can be configured to control operation of RF chains implemented by the transceiver(s) 316, as described further herein below.

The RF chain controller 318 can be configured in some example embodiments to tune an unused secondary RF chain to a frequency band, B, which may be causing interference with reception via an active RF chain using another frequency band. In this regard, the unused secondary RF chain may not be in active use for carrier aggregation, either because carrier aggregation has been deactivated, or because a number of CCs is less than the number of RF chains implemented on the device. The active RF chain can, for example, be the primary RF chain. It will be appreciated, however, that the active RF chain can alternatively be another secondary RF chain, such as in instances in which carrier aggregation is active such that a secondary RF chain is being used for carrier aggregation, but the number of CCs in use is less than the number of available RF chains.

The frequency band B to which the unused secondary RF chain can be tuned can, for example, be a frequency band substantially adjacent to the frequency band used by the active RF chain. A substantially adjacent frequency band can, for example, include a frequency band adjacent in a frequency spectrum to the frequency band used by the active RF chain. As another example, a substantially adjacent frequency band can include a frequency band that, while separated by some range from the frequency band used by the active RF chain, can be sufficiently proximate (e.g., close to) the frequency band used by the active RF chain to cause interference with the frequency band used by the active RF chain. In this regard, the frequency band B can be a band which may be a blocking adjacent interference band to the frequency band used by the active RF chain. An example of such a blocking adjacent interference band is defined in Third Generation Partnership Project (3GPP) TS 36.101 specifications for a primary chain operating in an LTE band. In some example embodiments, such as some example embodiments supporting in-device coexistence between radios using different wireless communication technologies, the frequency band B can include at least a portion of an ISM band, which can be substantially adjacent to a cellular frequency band, such as an LTE band, that can be used by the active RF chain. As another example, the frequency band B can be a frequency band associated with a cellular RAT other than a cellular RAT with which the frequency band used by the active RF chain can be associated.

After tuning the secondary RF chain to the frequency band B, the RF chain controller 318 can be configured to measure a signal characteristic of the frequency band B via the secondary RF chain. The measured signal characteristic can be a signal characteristic indicative of a level of interference from the frequency band B on reception by the active RF chain in the frequency band used by the active RF chain. For example, the measured signal characteristic can be a measure of a signal strength in the frequency band B. By way of non-limiting example, the measured signal characteristic can include one or more of a received signal strength indicator (RSSI), reference signal received quality (RSRQ), reference signal received power (RSRP), received signal code power (RSCP), signal to noise ratio (SNR), some combination thereof, or the like of the frequency band B. An indication of the measured signal characteristic can be provided to the active RF chain, such as via an interface between the RF chains, to enable adjustment of a configuration of the active RF chain to reduce an impact of interference from the frequency band B on reception by the active RF chain.

Figure 4:
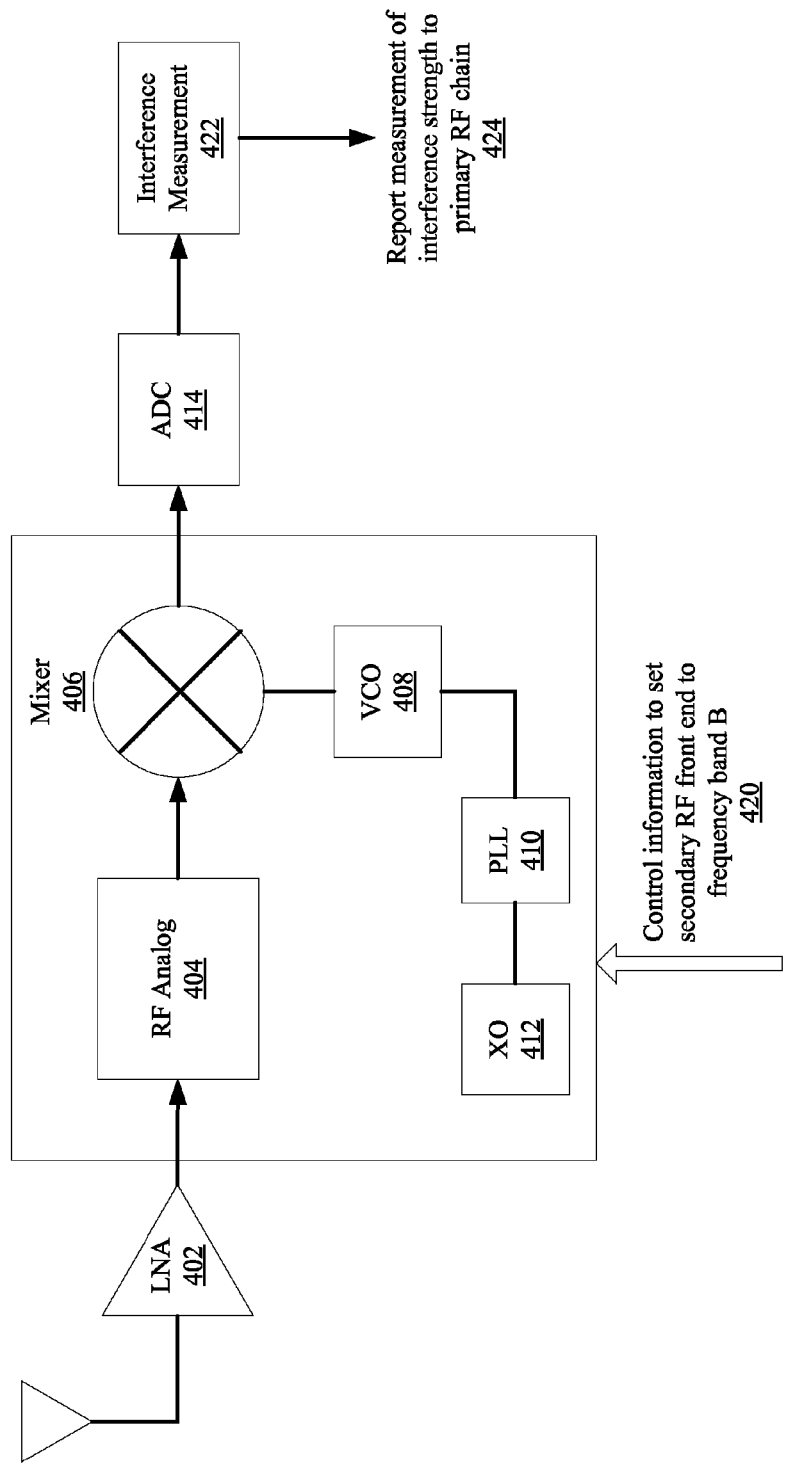
FIG. 4 illustrates operation of a secondary RF chain to improve reception by a wireless communication device in accordance with some example embodiments.

FIG. 4 illustrates operation of a secondary RF chain to improve reception by a wireless communication device in accordance with some example embodiments. The example RF chain of FIG. 4 can include a low-noise amplifier (LNA) 402, which can output an amplified RF analog output 404 of a received signal into a mixer 406. The mixer 406 can be coupled to voltage-controlled oscillator (VCO) 408, phase-locked loop (PLL) 410, and a clock, such as a crystal oscillator, (XO) 412. The output of the mixer 406 can be fed into an analog-to-digital converter (ADC) 414. It will be appreciated, however, that the selection and arrangement of components in the example RF chain illustrated in FIG. 4 is provided by way of example, and not by way of limitation. In this regard, the components illustrated in FIG. 4 may not be mandatory and thus some may be omitted in some embodiments. Additionally, in some example embodiments, an RF chain can include further or different components beyond those illustrated in FIG. 4.

As illustrated by reference 420, the RF chain controller 218 can provide control information to the secondary RF chain to set the RF front end to frequency band B. The output of the ADC 414 based on a signal received on frequency band B can be used to derive the interference measurement 422, which can be indicative of a level of interference from the frequency band B on reception by the active RF chain in the frequency band used by the active RF chain. In this regard, the interference measurement 422 can, for example, be defined in terms of RSSI, RSRP, RSRQ, RSCP, SNR, some combination thereof, or the like. As illustrated by reference 424, an indication of the interference measurement 422 can be reported to the primary RF chain (or other active RF chain).

The RF chain controller 218 can use a signal characteristic measured by the secondary RF chain in frequency band B to adjust a configuration of an active RF chain so as to reduce an impact of interference from the frequency band B on reception by the active RF chain. As an example, the RF chain controller 218 can adjust a configuration of an RF filter, such as a band pass filter 102, which can be used by the active RF chain based at least in part on the measured signal characteristic. In this regard, a configuration of the filter can be adjusted to cut more aggressively in the presence of adjacent channel interference. For example, a slope, coefficient, pass band, and/or other parameter defining a configuration of the RF filter can be adjusted to better filter out energy leakage from the frequency band B that may be interfering with reception by the active RF chain. In some example embodiments, the RF filter can be a digital filter, and the measured signal characteristic can be used to select a digital RF filter configuration (e.g., an optimal filter configuration) that will suppress the interference from the frequency band B.

As another example, the RF chain controller 218 can additionally or alternatively use a signal characteristic measured by the secondary RF chain in frequency band B to adjust a setpoint of an automatic gain control (AGC) loop to reduce an impact of interference from the frequency band B on reception by the active RF chain. In this regard, the amount of back off from maximum gain can be adjusted to address scenarios where interference from frequency band B might cause saturation of the signal received by the active RF chain and hence cause deterioration in signal decoding at the active RF chain.

Figure 5:
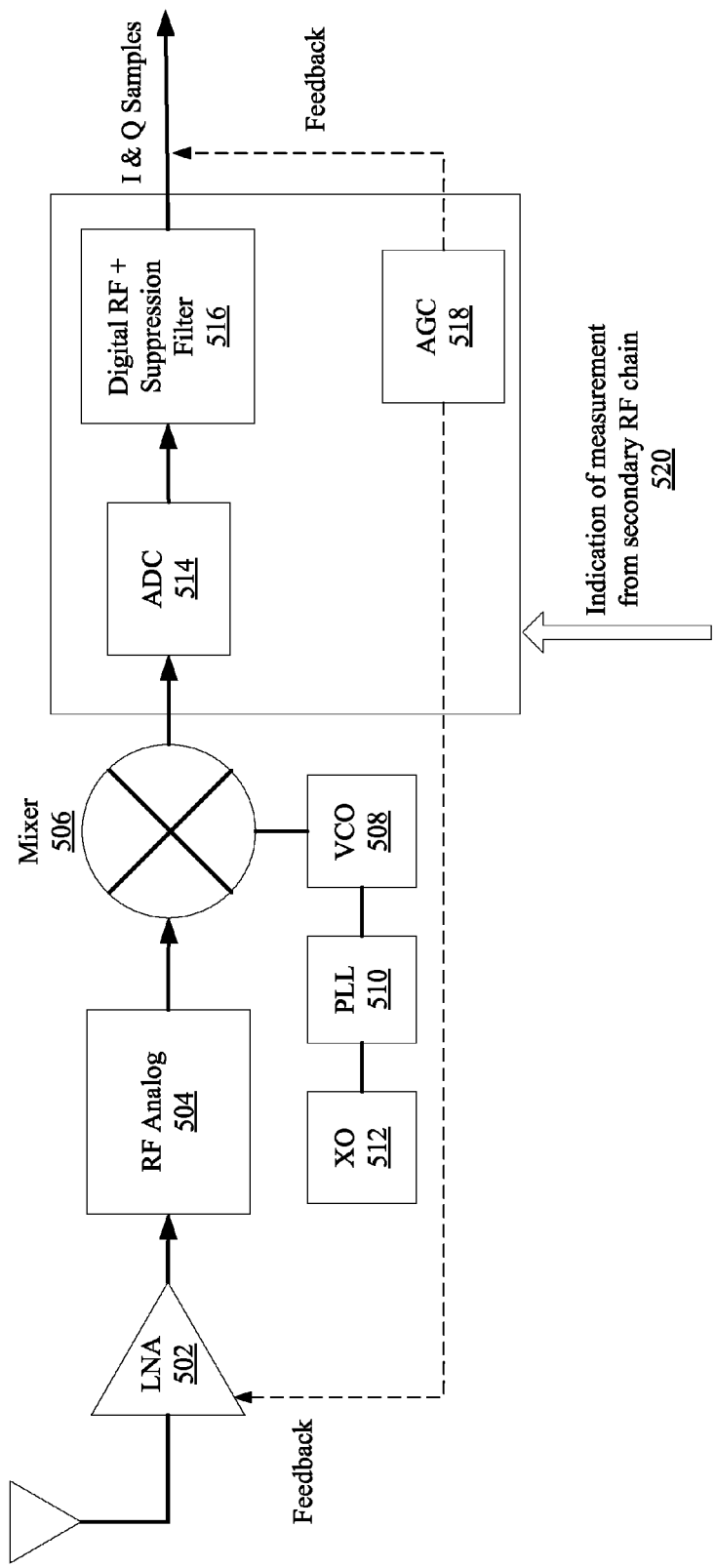
FIG. 5 illustrates operation of a primary RF chain to improve reception by a wireless communication device in accordance with some example embodiments.

FIG. 5 illustrates operation of a primary RF chain to improve reception by the primary RF chain based at least in part on feedback from a secondary RF chain in accordance with some example embodiments. It will be appreciated, however, that the example operation of the primary RF chain in FIG. 5 can also similarly be applied to a secondary RF chain that may be in active use for carrier aggregation purposes based on a measurement that can be made by a secondary RF chain that is not being actively used for carrier aggregation. The example RF chain of FIG. 5 can include an LNA 502, which can output an amplified RF analog output 504 of a received signal into a mixer 506. The mixer 506 can be coupled to a VCO 508, PLL 510, and an XO 512. The output of the mixer 506 can be fed into an ADC 514. The output of the ADC 514 can be passed through a digital RF and suppression filter 516, which can, for example, be a band pass filter. I and Q samples can be derived from the output of the filter 516. An AGC loop 518 can be used to provide feedback to the LNA 502 and the output of the filter 516, as illustrated in FIG. 5. It will be appreciated, however, that the selection and arrangement of components in the example RF chain illustrated in FIG. 5 is provided by way of example, and not by way of limitation. In this regard, the components illustrated in FIG. 5 may not be mandatory and thus some may be omitted in some embodiments. Additionally, in some example embodiments, an RF chain can include further or different components beyond those illustrated in FIG. 5.

As illustrated by reference 520, an indication of the measurement from a secondary RF chain (e.g., the interference measurement 422 from the example of FIG. 4) can be provided to the primary RF chain. A configuration of the filter 516 can be adjusted based at least in part on the measurement. Additionally or alternatively, a setpoint of the AGC loop 518 can be adjusted. In this regard, a measurement from a secondary RF chain indicative of a level of interference from an adjacent frequency band or other frequency band that may interfere with reception by the primary RF chain can be fed to the primary RF chain and used to adjust a configuration of the primary RF chain to reduce an impact of interference on reception by the primary RF chain.

Figure 6:
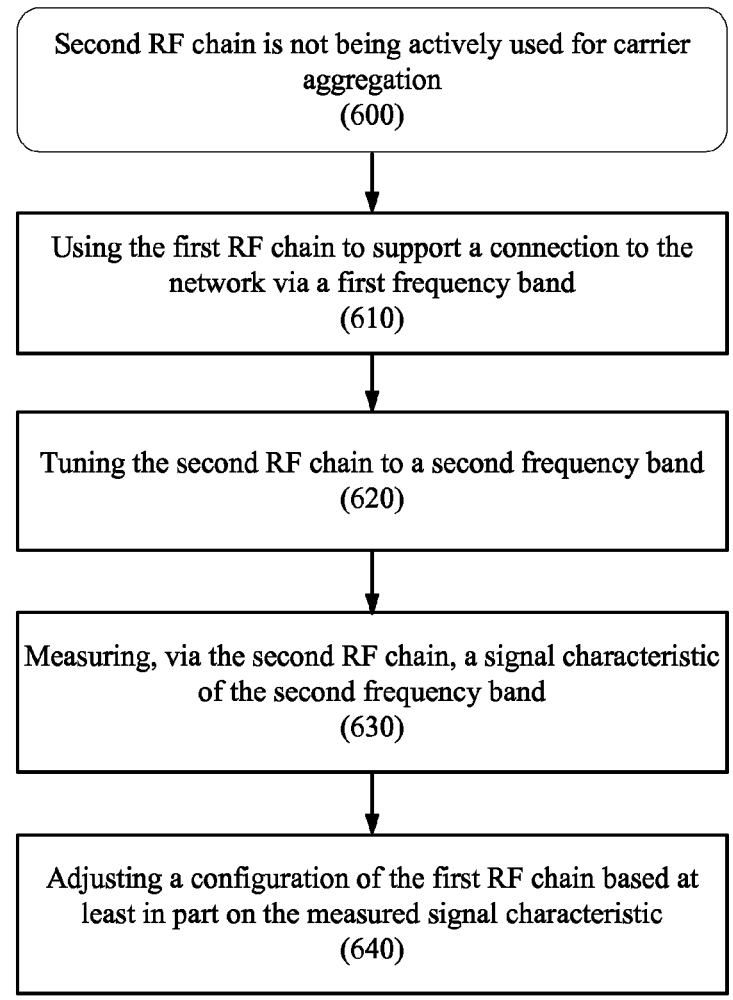
FIG. 6 illustrates a flow chart according to an example method for improving reception by a carrier aggregation capable wireless communication device in accordance with some example embodiments.

FIG. 6 illustrates a flow chart according to an example method for improving reception by a carrier aggregation capable wireless communication device, such as wireless communication device 202, including at least two RF chains in accordance with some example embodiments. In this regard, the wireless communication device can include at least a first RF chain and a second RF chain. One or more of processing circuitry 310, processor 312, memory 314, transceiver(s) 316, or RF chain controller 318 can, for example, provide means for performing the operations illustrated in and described with respect to FIG. 6.

As illustrated in FIG. 6, at initial state 600, the second RF chain is not being actively used for carrier aggregation. For example, carrier aggregation may have been disabled, such s via MAC signaling from the network. As another example, carrier aggregation may be active, but there may not be enough active CCs to use a full complement of available RF chains on the wireless communication device. In this regard, a CC corresponding to the second RF chain may be deactivated.

Operation 610 can include the wireless communication device using the first RF chain to support a connection to a network, such as a connection to the serving base station 204, via a first frequency band. The first RF chain can, for example, be a primary RF chain corresponding to a primary CC. As another example, in instances in which carrier aggregation may be activated but one or more secondary RF chains on the wireless communication device may be unused, the first RF chain can be a secondary RF chain corresponding to a secondary CC.

Operation 620 can include the wireless communication device tuning the second RF chain to a second frequency band. The second frequency band can be a frequency band that may be causing interference with reception by the first RF chain via the first frequency band. For example, the second frequency band can be a frequency band substantially adjacent to the first frequency band.

Operation 630 can include the wireless communication device measuring, via the second RF chain, a signal characteristic of the second frequency band. The measured signal characteristic can, for example, a measure of a signal strength in the second frequency band and/or other measured signal characteristic that can be indicative of a level of interference from the second frequency band on reception by the first RF chain in the first frequency band. By way of non-limiting example, the measured signal characteristic can be an RSSI, RSRP, RSRQ, RSCP, SNR, some combination thereof, or the like.

Operation 640 can include the wireless communication device adjusting a configuration of the first RF chain based at least in part on the measured signal characteristic. In this regard, an indication of the measured signal characteristic can be passed to the first RF chain, such as via an interface between the first RF chain and the second RF chain. For example, operation 640 can include adjusting a configuration of an RF filter that can be used by the first RF chain to mitigate interference from the second RF band. As another example, operation 640 can additionally or alternatively include adjusting a setpoint of an AGC loop on the first RF chain.

Operations 620-630 can be performed at any time during which the second RF chain is not being actively used for carrier aggregation. In some example embodiments, measurement of the second frequency band (e.g., operation 630) can be performed multiple times, such as periodically, while the second RF chain is not being actively used for carrier aggregation. Adjustment of a configuration of the first RF chain (e.g., Operation 640) can, in turn, be performed for each measurement of the second frequency band, or can be selectively performed in an instance in which a measured signal characteristic indicates that a configuration of the first RF chain should be adjusted, such as due to a change in a measured level of interference from the second frequency band. In some example embodiments, operation 640 can be performed during a time at which the second RF chain is not being actively used for carrier aggregation. However, in some example embodiments, the second RF chain can be tuned away from the second frequency band, such as to a frequency band associated with a component carrier on the network, after performance of operation 630 and can be used for carrier aggregation on the network prior to and/or during performance of operation 640.

Figure 7:
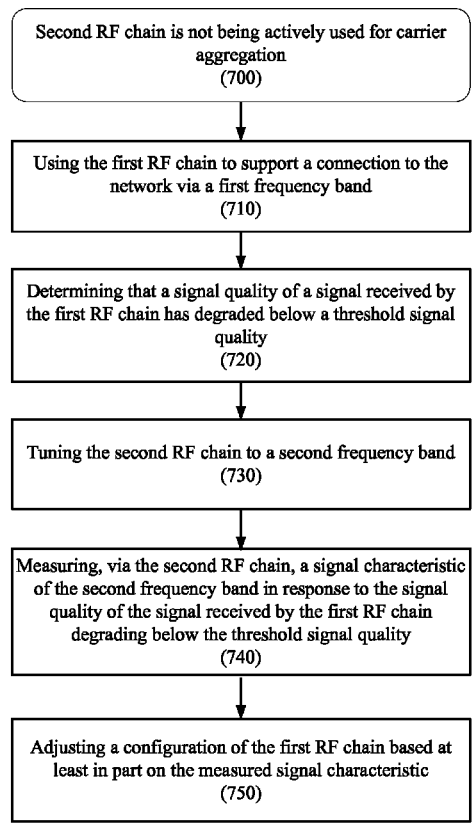
FIG. 7 illustrates a flow chart according to another example method for improving reception by a carrier aggregation capable wireless communication device in accordance with some example embodiments.

In some example embodiments, measurement of the second frequency band (e.g., operation 630) can be performed in response to a trigger, such as a signal quality of a signal received by the first RF chain degrading below a threshold signal quality. For example, the second frequency band can be measured in an instance in which the power in the first RF chain is close to a saturation level. As another example, the second frequency band can be measured in response to a signal quality measurement, such as RSRP, RSSI, RSRQ, SNR, and/or the like for a signal received by the first RF chain falling below a threshold. FIG. 7 illustrates a flow chart according to an example method for improving reception by a carrier aggregation capable wireless communication device, such as wireless communication device 202, in accordance with some such example embodiments in which measurement of a signal characteristic can be performed in response to a trigger.

FIG. 7 illustrates operations that can be performed by a wireless communication device including at least a first RF chain and a second RF chain. One or more of processing circuitry 310, processor 312, memory 314, transceiver(s) 316, or RF chain controller 318 can, for example, provide means for performing the operations illustrated in and described with respect to FIG. 7.

As illustrated in FIG. 7, at initial state 700, the second RF chain is not being actively used for carrier aggregation. For example, carrier aggregation may have been disabled, such s via MAC signaling from the network. As another example, carrier aggregation may be active, but there may not be enough active CCs to use a full complement of available RF chains on the wireless communication device. In this regard, a CC corresponding to the second RF chain may be deactivated.

Operation 710 can include the wireless communication device using the first RF chain to support a connection to the network, such as a connection to the serving base station 204, via a first frequency band. The first RF chain can, for example, be a primary RF chain corresponding to a primary CC. As another example, in instances in which carrier aggregation may be activated but one or more secondary RF chains on the wireless communication device may be unused, the first RF chain can be a secondary RF chain corresponding to a secondary CC. In this regard, operation 710 can correspond to operation 610.

Operation 720 can include the wireless communication device determining that a signal quality of a signal received by the first RF chain has degraded below a threshold signal quality. For example, operation 720 can include determining that a power in the receiver is close (e.g., within a threshold range) of a saturation level. As another example, operation 720 can include determining that a signal quality measurement, such as RSRP, RSSI, RSRQ, SNR, and/or the like for a signal received by the first RF chain has fallen below a threshold.

Operation 730 can include the wireless communication device tuning the second RF chain to a second frequency band. In this regard, operation 730 can correspond to operation 620. In some example embodiments, operation 730 can be omitted, if the second RF chain has been tuned to the second frequency band prior to performance of operation 720.

Operation 740 can include the wireless communication device measuring, via the second RF chain, a signal characteristic of the second frequency band in response to the signal quality of the signal received by the first RF chain degrading below the threshold signal quality. Operation 750 can include the wireless communication device adjusting a configuration of the first RF chain based at least in part on the measured signal characteristic. In this regard, operation 750 can correspond to operation 640.

Figure 8:
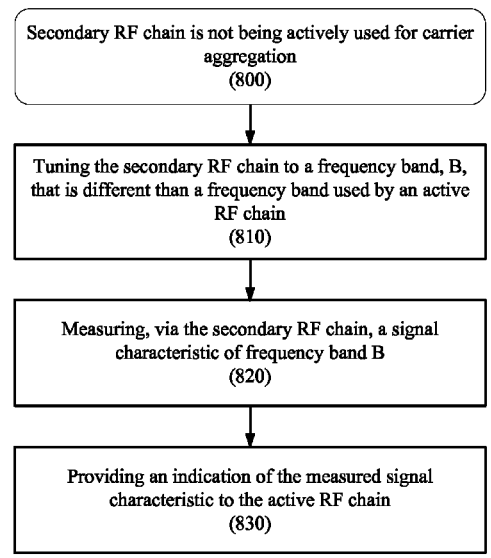
FIG. 8 illustrates a flow chart of operations that can be performed by a secondary RF chain in accordance with some example embodiments.

FIG. 8 illustrates a flow chart of operations that can be performed by a secondary RF chain in accordance with some example embodiments. For example, the operations illustrated in FIG. 8 can be performed by the secondary RF chain illustrated in and described with respect to FIG. 4. One or more of processing circuitry 310, processor 312, memory 314, transceiver(s) 316, or RF chain controller 318 can, for example, provide means for performing the operations illustrated in and described with respect to FIG. 8.

At the initial state 800, the secondary RF chain is not being actively used for carrier aggregation. In this regard, carrier aggregation can, for example, be deactivated. As another example, carrier aggregation can be activated, but the secondary RF chain may not be in use, as there may be more RF chains on the device than the number of active CCs.

Operation 810 can include tuning the secondary RF chain the to a frequency band, B, that is different than a frequency band used by an active RF chain. The active RF chain can be a primary RF chain associated with a primary CC, or can be another secondary RF chain that may be in use for carrier aggregation. Operation 820 can include measuring, via the secondary RF chain, a signal characteristic of frequency band B. Operation 830 can include providing an indication of the measured signal characteristic to the active RF chain, such as via an interface between the secondary RF chain and the active RF chain.

Figure 9:
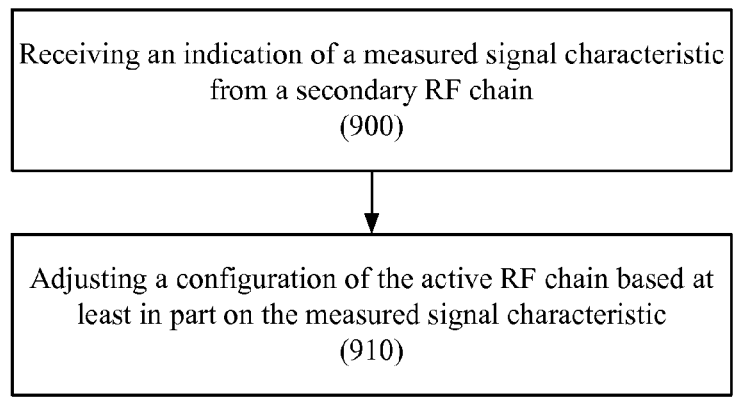
FIG. 9 illustrates a flow chart of operations that can be performed by an active RF chain in accordance with some example embodiments.

FIG. 9 illustrates a flow chart of operations that can be performed by an active RF chain in accordance with some example embodiments. The active RF chain can be a primary RF chain, such as can be associated with a primary CC. As another example, the active RF chain can be a secondary RF chain actively being used to support a secondary CC. The operations illustrated in FIG. 9 can, for example, be performed by the RF chain illustrated in and described with respect to FIG. 5. One or more of processing circuitry 310, processor 312, memory 314, transceiver(s) 316, or RF chain controller 318 can, for example, provide means for performing the operations illustrated in and described with respect to FIG. 9.

Operation 900 can include the active RF chain receiving an indication of a measured signal characteristic from a secondary RF chain, such as via an interface with the secondary RF chain. In this regard, operation 900 can include receiving an indication of a measured signal characteristic that can be provided by a secondary RF chain attendant to performance of operation 830.

Operation 910 can include adjusting a configuration of the active RF chain based at least in part on the measured signal characteristic. For example, operation 910 can include adjusting a configuration of an RF filter that can be used by the active RF chain to mitigate interference. As another example, operation 910 can additionally or alternatively include adjusting a setpoint of an AGC loop on the active RF chain.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

In the foregoing detailed description, reference was made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Further, the foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. The description of and examples disclosed with respect to the embodiments presented in the foregoing description are provided solely to add context and aid in the understanding of the described embodiments. The description is not intended to be exhaustive or to limit the described embodiments to the precise forms disclosed. It will be apparent to one of ordinary skill in the art that many modifications, alternative applications, and variations are possible in view of the above teachings. In this regard, one of ordinary skill in the art will readily appreciate that the described embodiments may be practiced without some or all of these specific details. Further, in some instances, well known process steps have not been described in detail in order to avoid unnecessarily obscuring the described embodiments.

What is claimed is:

1. A method for improving reception by a carrier aggregation capable wireless communication device comprising a first radio frequency (RF) chain and a second RF chain configurable to support carrier aggregation of multiple component carriers on a carrier aggregation capable network, the method comprising the wireless communication device:
    using the first RF chain to support a connection to the carrier aggregation capable network via a first frequency band;
    determining that a signal quality of a signal received by the first RF chain has degraded below a threshold signal quality;
    tuning the second RF chain to a second frequency band, the second RF chain not being actively used for carrier aggregation;
    measuring, via the second RF chain, a signal characteristic of the second frequency band while the second RF chain is not being actively used for carrier aggregation in response to the signal quality of the signal received by the first RF chain degrading below the threshold signal quality; and
    adjusting a configuration of the first RF chain based at least in part on the measured signal characteristic.

2. The method of claim 1, wherein adjusting the configuration of the first RF chain comprises adjusting a setpoint of an automatic gain control (AGC) loop on the first RF chain based at least in part on the measured signal characteristic.

3. The method of claim 1, wherein adjusting the configuration of the first RF chain comprises adjusting a configuration of a radio frequency filter used by the first RF chain based at least in part on the measured signal characteristic.

4. The method of claim 1, wherein the second frequency band comprises a frequency band substantially adjacent to the first frequency band.

5. The method of claim 1, wherein the first frequency band comprises a frequency band associated with a first cellular radio access technology, the first cellular radio access technology being used by the carrier aggregation capable network, and wherein the second frequency band comprises a frequency band associated with a second cellular radio access technology.

6. The method of claim 1, wherein the first frequency band comprises a frequency band associated with a cellular radio access technology used by the carrier aggregation capable network, and wherein the second frequency band comprises at least a portion of an Industrial, Scientific, and Medical (ISM) band.

7. The method of claim 1, wherein measuring the signal characteristic of the second frequency band comprises measuring one or more of a received signal strength indicator (RSSI), a reference signal received quality (RSRQ), a reference signal received power (RSRP), a received signal code power (RSCP), or a signal-to-noise ratio (SNR) of the second frequency band.

8. The method of claim 1, wherein measuring the signal characteristic of the second frequency band comprises measuring the signal characteristic of the second frequency band periodically while the second RF chain is not being used for carrier aggregation.

9. A wireless communication device comprising:
    a first radio frequency (RF) chain;
    a second RF chain, the first RF chain and the second RF chain being configurable to support carrier aggregation; and
    processing circuitry, the processing circuitry configured to control the wireless communication device to at least:

use the first radio frequency (RF) chain to support a connection to a network via a first frequency band;

determine that a signal quality of a signal received by the first RF chain has degraded below a threshold signal quality;

tune the second RF chain to a second frequency band in an instance in which the second RF chain is not being actively used for carrier aggregation;

measure, via the second RF chain, a signal characteristic of the second frequency band in response to the signal quality of the signal received by the first RF chain degrading below the threshold signal quality; and adjust a configuration of the first RF chain based at least in part on the measured signal characteristic.

10. The wireless communication device of claim 9, wherein the processing circuitry is configured to control the wireless communication device to adjust the configuration of the first RF chain at least in part by adjusting a setpoint of an automatic gain control (AGC) loop on the first RF chain based at least in part on the measured signal characteristic.

11. The wireless communication device of claim 9, wherein the processing circuitry is configured to control the wireless communication device to adjust the configuration of the first RF chain at least in part by adjusting a configuration of a radio frequency filter used by the first RF chain based at least in part on the measured signal characteristic.

12. The wireless communication device of claim 9, wherein the second frequency band comprises a frequency band substantially adjacent to the first frequency band.

13. The wireless communication device of claim 9, wherein the first frequency band comprises a frequency band associated with a first cellular radio access technology, the first cellular radio access technology being used by the network, and wherein the second frequency band comprises a frequency band associated with a second cellular radio access technology.

14. The wireless communication device of claim 9, wherein the first frequency band comprises a frequency band associated with a cellular radio access technology used by the network, and wherein the second frequency band comprises at least a portion of an Industrial, Scientific, and Medical (ISM) band.

15. The wireless communication device of claim 9, wherein the processing circuitry is configured to control the wireless communication device to measure the signal characteristic of the second frequency band periodically while the second RF chain is not being used for carrier aggregation.

16. A computer program product for improving reception by a carrier aggregation capable wireless communication device, the computer program product comprising at least one non-transitory computer readable storage medium having computer program code stored thereon, the computer program code comprising:

program code for using a first radio frequency (RF) chain to support a connection to a network via a first frequency band;

program code for determining that a signal quality of a signal received by the first RF chain has degraded below a threshold signal quality;

program code for tuning a second RF chain to a second frequency band, the second RF chain not being actively used for carrier aggregation;

program code for measuring, via the second RF chain, a signal characteristic of the second frequency band in response to the signal quality of the signal received by the first RF chain degrading below the threshold signal quality; and program code for adjusting a configuration of the first RF chain based at least in part on the measured signal characteristic.

17. The computer program product of claim 16, wherein the program code for adjusting the configuration of the first RF chain comprises program code for adjusting a setpoint of an automatic gain control (AGC) loop on the first RF chain based at least in part on the measured signal characteristic.

\* \* \* \* \*